United States Patent
Monahan et al.

(10) Patent No.: US 6,648,396 B2
(45) Date of Patent: Nov. 18, 2003

(54) FOLDABLE SUNSHADES (75) Inventors: Robert D. Monahan, Canton, MA (US); Ten-Chang Liu, Tainan Hsien (TW)

(73) Assignee: The First Years, Inc., Lake Forest, CA (US)

(*) Notice: Subject to any disclaimer, the term of this patent is extended or adjusted under 35 U.S.C. 154(b) by 0 days.

(21) Appl. No.: 09/956,327

(22) Filed: Sep. 19, 2001

(65) Prior Publication Data

US 2002/0070581 A1 Jun. 13, 2002

Related U.S. Application Data (60) Provisional application No. 60/234,615, filed on Sep. 22, 2000.

(51) Int. Cl.⁷ .................................................. B60J 3/00
(52) U.S. Cl. ................ 296/97.7; 296/97.8; 160/370.21
(58) Field of Search .............................. 296/97.7, 97.8, 296/97.2, 97.3, 97.9; 150/166, 168; 160/370.21, 370.22, 370.23

(56) References Cited

U.S. PATENT DOCUMENTS

| | | | |
|---|---|---|---|
| 2,646,118 A | | 7/1953 | Berty |
| 3,073,544 A | | 1/1963 | Cirves et al. |
| 3,338,293 A | | 8/1967 | Hohmann |
| 3,409,988 A | | 11/1968 | Zelnick |
| 4,181,350 A | | 1/1980 | Eichstaedt |
| 4,459,753 A | | 7/1984 | Nagasawa et al. |
| 4,825,921 A | * | 5/1989 | Rigter |
| 4,883,304 A | * | 11/1989 | Elliott ........................ 296/97.8 |
| 4,893,668 A | | 1/1990 | Nomura |
| 5,016,937 A | * | 5/1991 | White ........................ 296/97.7 |
| 5,035,460 A | | 7/1991 | Huang |
| 5,076,633 A | * | 12/1991 | Hsu et al. ................... 296/97.4 |
| 5,267,599 A | * | 12/1993 | Kim ......................... 160/370.2 |
| 5,314,226 A | * | 5/1994 | Tovar ........................ 296/97.7 |
| 5,495,884 A | | 3/1996 | Shikler |
| 5,553,908 A | | 9/1996 | Shink |
| 6,004,415 A | | 12/1999 | Ko |
| 6,309,076 B1 | * | 10/2001 | McVicker .............. 296/97.8 X |

* cited by examiner

Primary Examiner—Joseph D. Pape
(74) Attorney, Agent, or Firm—Fish & Richardson P.C.

(57) ABSTRACT

Sunshades for vehicle windows are provided, including a shade having upper and lower edges, and a pair of support members having free ends. One of the members is associated with each of the upper and lower edges, and the support members are constructed to be spaced apart to support the shade in an extended, open position during use. Each of the support members includes a self-straightening tape that is arcuate in cross-section and can be repeatedly folded without significant plastic deformation.

34 Claims, 8 Drawing Sheets

FOLDABLE SUNSHADES

This application claims the benefit of Provisional Application No. 60/234,619 filed Sep. 22, 2000.

TECHNICAL FIELD

This invention relates to sunshades for vehicle windows.

BACKGROUND

For a number of years, sunshades have been used in vehicle windows to prevent overheating and sunburn of passengers, particularly small children and infants in the vehicle. Sunshades may also reduce glare experienced by the driver and passengers, and reduce damage to the interior of the vehicle.

Many vehicle sunshades are adhered to the inner surface of the window, e.g., using suction cups. Some sunshades are of a roll-up construction, similar to roller blinds used in home windows. Other sunshades are of a spring loop construction, having a loop frame member that springs open to full size in use, but requires a sequence of motions not particularly intuitive to many users to collapse the shade for storage. Users often desire to remove the sunshade at certain times, e.g., for use in another vehicle, or for storage when not in use, and some would prefer a shade to be readily collapsible to an easily storable size and shape.

SUMMARY

The present invention features vehicle sunshades that can be rectilinearly folded to a short length, then rolled and secured, allowing the sunshade to be easily transported, e.g., in a user's handbag, and conveniently stored. When the sunshade is to be used, it's frame members resiliently spring into an open, extended position, ready to be secured in the vehicle window to block some sunlight.

In one aspect, the invention features a sunshade for a vehicle window, including: (a) a shade having upper and lower edges; and (b) a pair of support members having free ends, one of the members being associated with each of the upper and lower edges, the support members being constructed to be spaced apart to support the shade in an extended, open position during use; each of the support members comprising a self-straightening tape that is arcuate in cross-section and can be repeatedly folded without significant plastic deformation.

Implementations of the invention may include one or more of the following features. The upper and lower edges each include a hem and the support members are retained in the hems. The hem of the upper edge is segmented, the sunshade further comprising fastening means secured to the support member of the upper edge and positioned between segments of the upper edge hem. The sunshade also includes, mounted on the upper support member, a plurality of suction cups to secure the sunshade to the window. Bases of the suction cups are arranged to not overlap along the length of the folded tape when the tape is folded into equal thirds. Each of the suction cups includes a bore through which the support members extend. Each of the support members comprises a length of convex rule material. The support members are formed of a material selected from the group consisting of steel, fiberglass and plastic. The support members are coated with plastic or epoxy. The arcuate cross-section has a radius of curvature of from about 15 to 25 millimeters. The sunshade further includes a plurality of straps, extending from the lower edge constructed and arranged to secure the sunshade in a rolled configuration. Each strap includes an array of hook-engageable fibers and an array of hooks positioned to selectively engage the fibers when the sunshade is in a rolled configuration and the strap is wrapped around the rolled shade. The straps each carry a tab at a free end thereof, the tab of a size and shape selected to enable the tab to be wedged behind a back seat of a vehicle to secure the lower edge of the shade. The supporting members are constructed to allow the shade to be folded in thirds for storage, and to resiliently return the shade to its open position for use. The shade comprises a length of fabric, e.g., a mesh material.

In another aspect, the invention features a method of collapsing a reusable vehicular sunshade for storage between uses, including (a) folding both upper and lower edge support members of the sunshade at multiple points to place the sunshade in a flat, folded condition having a width significantly less than that of the sunshade in its unfolded state; (b) rolling the folded sunshade about its upper edge support member to form a roll with the lower edge member of the sunshade disposed along an outer surface of the roll; and then (c) wrapping a releasable strap about the rolled sunshade to retain it in its folded and rolled condition.

In yet a further aspect, the invention features a method of blocking sunlight within a vehicle, including (a) providing a sunshade as described above; (b) attaching the upper edge of the sunshade to the vehicle near an upper edge of a window of the vehicle; and (c) attaching the lower edge of the sunshade to the vehicle at a point spaced apart from and lower than the upper edge of the sunshade, to extend the shade across a significant portion of the window to block at least some sunlight entering the window.

The invention also features a method of blocking sunlight within a vehicle that includes: (a) providing a shade of flexible sheet material having an opacity that increases with an angle of incidence with respect to a direction normal to the sheet material, the shade having upper and lower edges and a self-straightening support member extending along its upper edge; (b) securing the upper edge of the shade to the vehicle along an upper portion of an inclined rear window of the vehicle, at a point above a forward edge of a rear deck of the vehicle spanning a horizontal space between a base edge of the rear window and an upper rear seat back of the vehicle; and (c) securing the lower edge of the shade to the vehicle at a point forward of the rear deck, such that fore-aft inclination of the shade in its secured position is significantly less than that of the window, such that the opacity of the shade relative to light entering the vehicle generally normal to the inclined rear window is substantially greater than the opacity of the shade relative to a line of sight extending generally horizontally through the rear window.

In preferred implementations, the lower edge of the shade is secured to the vehicle by wedging a free end of a strap, extending from the lower edge of the shade, between the rear deck and the upper rear seat back.

The term "self-straightening tape", as used herein, refers to an elongated material that normally tends to a straight, extended position, that can be readily folded or coiled and that, when released from the folded position, will resiliently return to its normal, extended position.

The phrase "convex rule material", as used here, refers to an elongated tape that would be suitable for use as the tape of a retractable tape measure, i.e., a self-straightening elongated tape having a curved transverse form defining a valley extending in the longitudinal direction, the cross-section being curved so as to resist bending about its neutral axis.

Other features and advantages of the invention will be apparent from the description and drawings, and from the claims.

DETAILED DESCRIPTION

Figure 1:
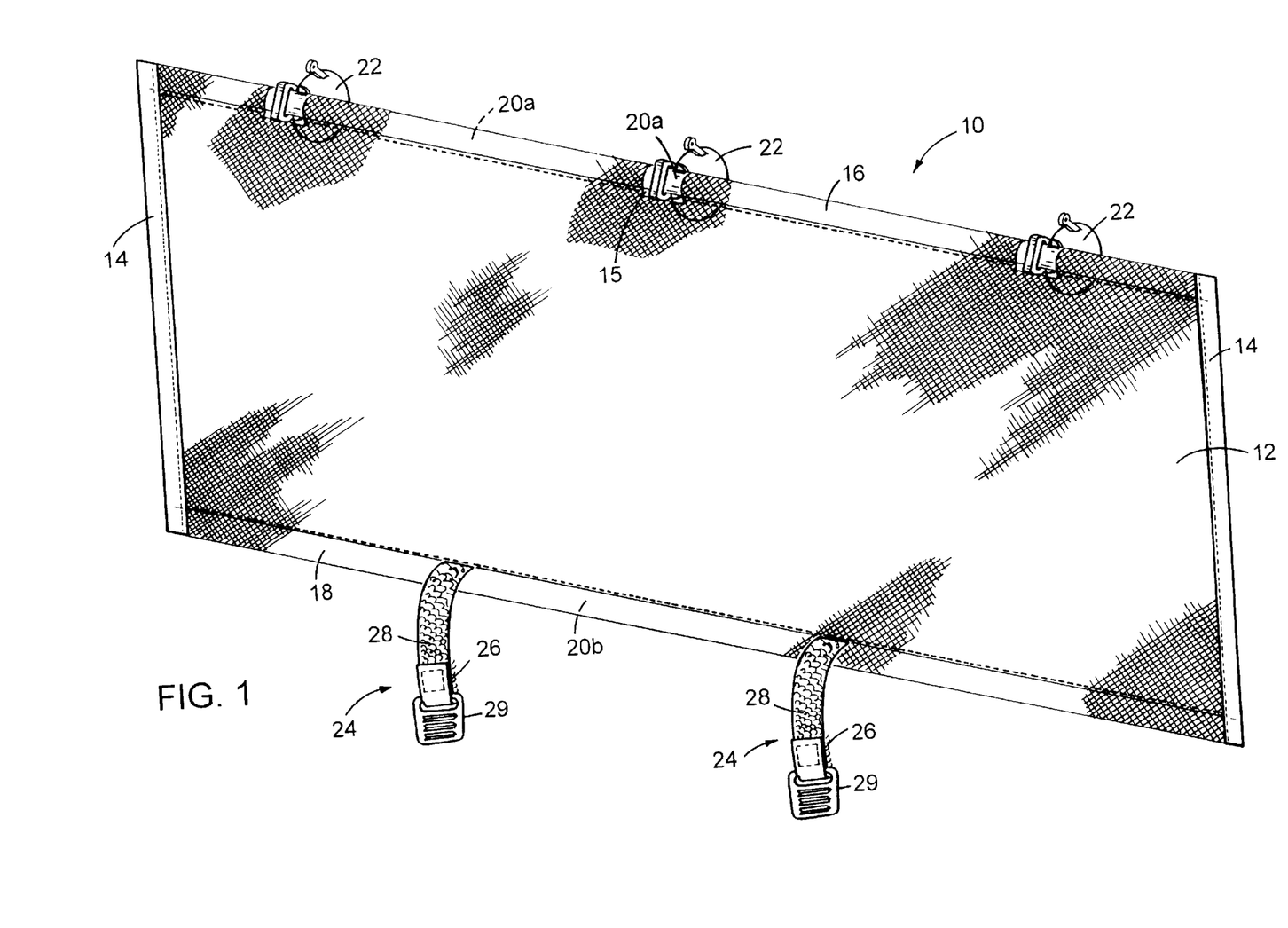
FIG. 1 is a perspective view of a sunshade according to one embodiment of the invention.

Referring to FIG. 1, sunshade 10 includes a fabric shade 12 having side hems 14, an upper hem 16 and a lower hem 18. The fabric shade 12 is preferably formed of a mesh material. Disposed within upper hem 16 and lower hem 18 are flexible, resilient upper and lower supporting members 20a, 20b. Three suction cups 22 are mounted on upper supporting member 20a, and extend through openings 15 in upper hem 16. Securing straps 24 extend from lower hem 18, each securing strap carrying both a hook element 26 and a loop element 28 of a hook and loop fastener mounted on opposite sides of the strap, and a molded plastic tab or clip 29 at the end of the strap for wedging between the rear seat back and speaker deck of the vehicle to secure the lower edge of the shade (see FIGS. 5A and 5B). The hook and loop elements are arranged for cooperative engagement when the strap is wrapped around the rolled shade, e.g., as shown in FIG. 4C.

Figure 2:
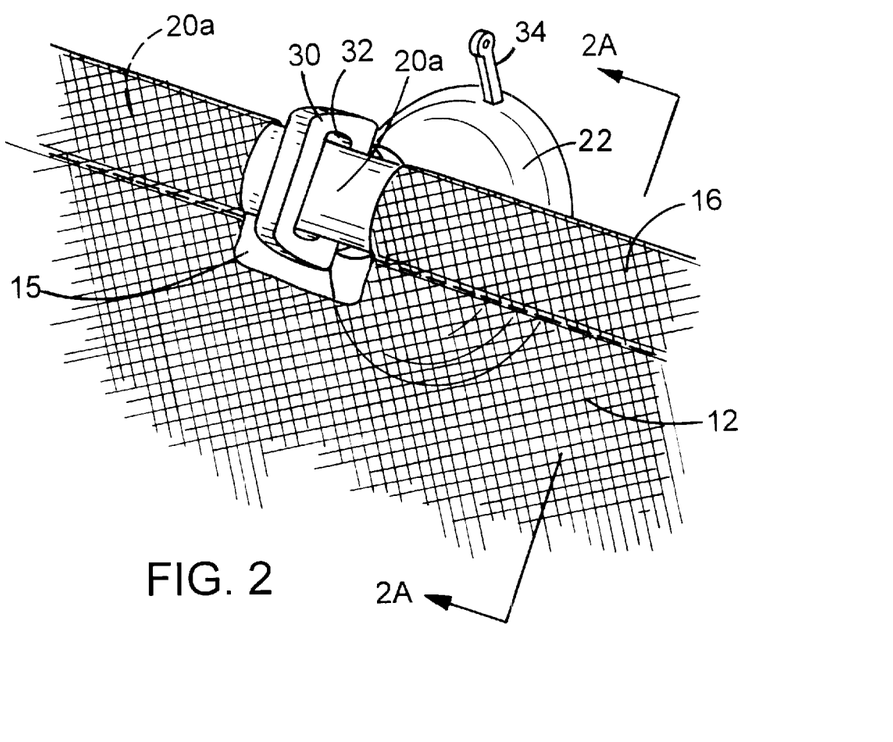
FIG. 2 is an enlarged, detail view of a portion of the sunshade of FIG. 1.
Figure 2A:
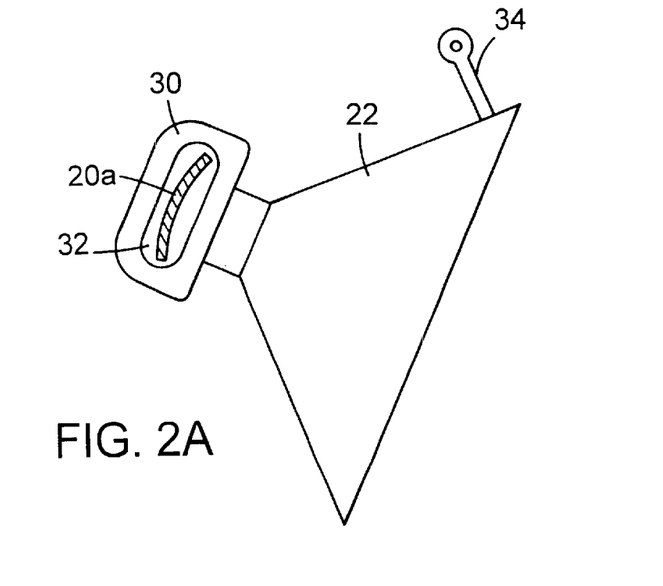
FIG. 2A is a cross-sectional view taken along line 2A—2A in FIG. 2.

As shown in FIGS. 2 and 2A, suction cups 22 are secured to the upper supporting member 20a by mounting member 30, which includes a bore 32 through which the supporting member 20a extends. Finger 34 extends from a back surface of the bowl of each suction cup for ready grasping and local deformation of the suction cup bowl to break suction for removing the shade.

Figure 3:
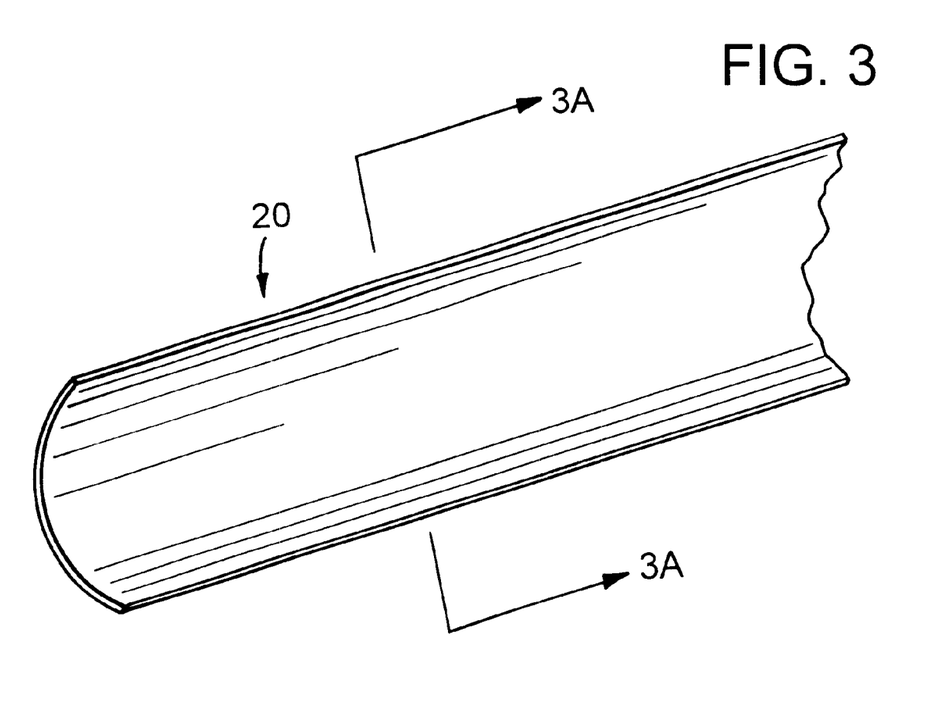
FIG. 3 is a perspective view of a support member according to one embodiment of the invention.
Figure 3A:
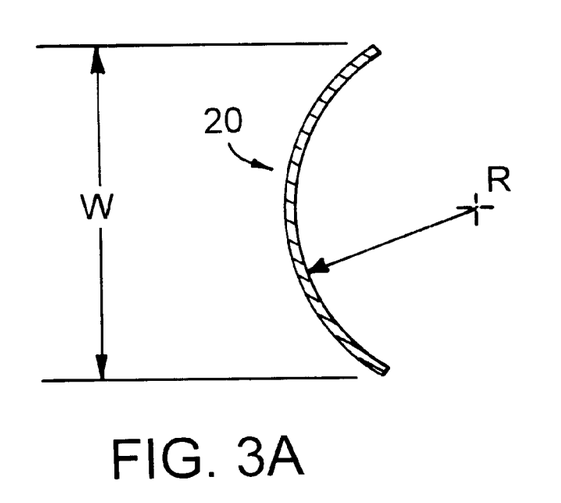
FIG. 3A is a cross-sectional view of the support member of FIG. 3, taken along line 3A—3A.

As shown in FIGS. 2A, 3 and 3A, the supporting members 20 are elongate, and have a substantially arcuate cross-section, the member being curved about its longitudinal axis. Thus, the preferred shape of the supporting members is similar to that of the tape of a retractable tape measure, i.e., the supporting member has a curved transverse form defining a valley extending in the longitudinal direction. This shape is often referred to in the tape measure art as "concavo-convex", and tapes having this shape are referred to as "convex rules". The curved transverse form gives the member a beam stiffness to resist bending. The cross-sectional profile is preferably selected to cause the tape to undergo localized, hyper-elastic deformation within its cross-section once bent beyond a critical beam deflection and so to locally reduce or eliminate its cross-sectional curvature and so reduce its local bending modulus, while retaining its modulus and cross-sectional profile at points away from the bend so as to produce a restorative force in the form of retained strain energy. Once bent from its straightened state enough to buckle its transverse arc shape, the beam stiffness of the member is drastically reduced at the point of the bend, although it retains some resiliency and will tend to its straightened condition if released. The member can be folded, but must be restrained in order to be maintained in its folded condition; if unrestrained, the member will assume a substantially straight rod-like condition. As a result, convex rules are sometimes referred to in the tape measure art as being "self-straightening". Repeated folding of the member will generally not result in plastic deformation of the member, so long as the member is not heavily creased.

Preferably the supporting members have a radius of curvature "R" (FIG. 3A) of from about 15 to 25 millimeters, and a width W of from about 10 to 25 millimeters. Suitable geometries for self-straightening tapes are disclosed, e.g., in U.S. Pat. Nos. 4,459,753, 3,409,988, and 3,073,544, the disclosures of which are incorporated herein by reference. The supporting members are generally the same length as the upper and lower hems of the sunshade, e.g., from about 70 to 100 centimeters for a rear window shade, and about 20 to 50 centimeters for a side window shade, which corresponds to the width of the sunshade as installed in the vehicle.

Suitable materials for the supporting members include spring steel, fiberglass, and plastics such as polyethylene terephthalate (commercially available under the trade name MYLAR) and polytetrafluoroethylene (commercially available under the trade name TEFLON). The supporting members may be coated, e.g., with an epoxy or a plastic. If the supporting members are formed from steel such a coating may prevent corrosion and/or enhance the aesthetic qualities of the supporting members.

Figure 4:
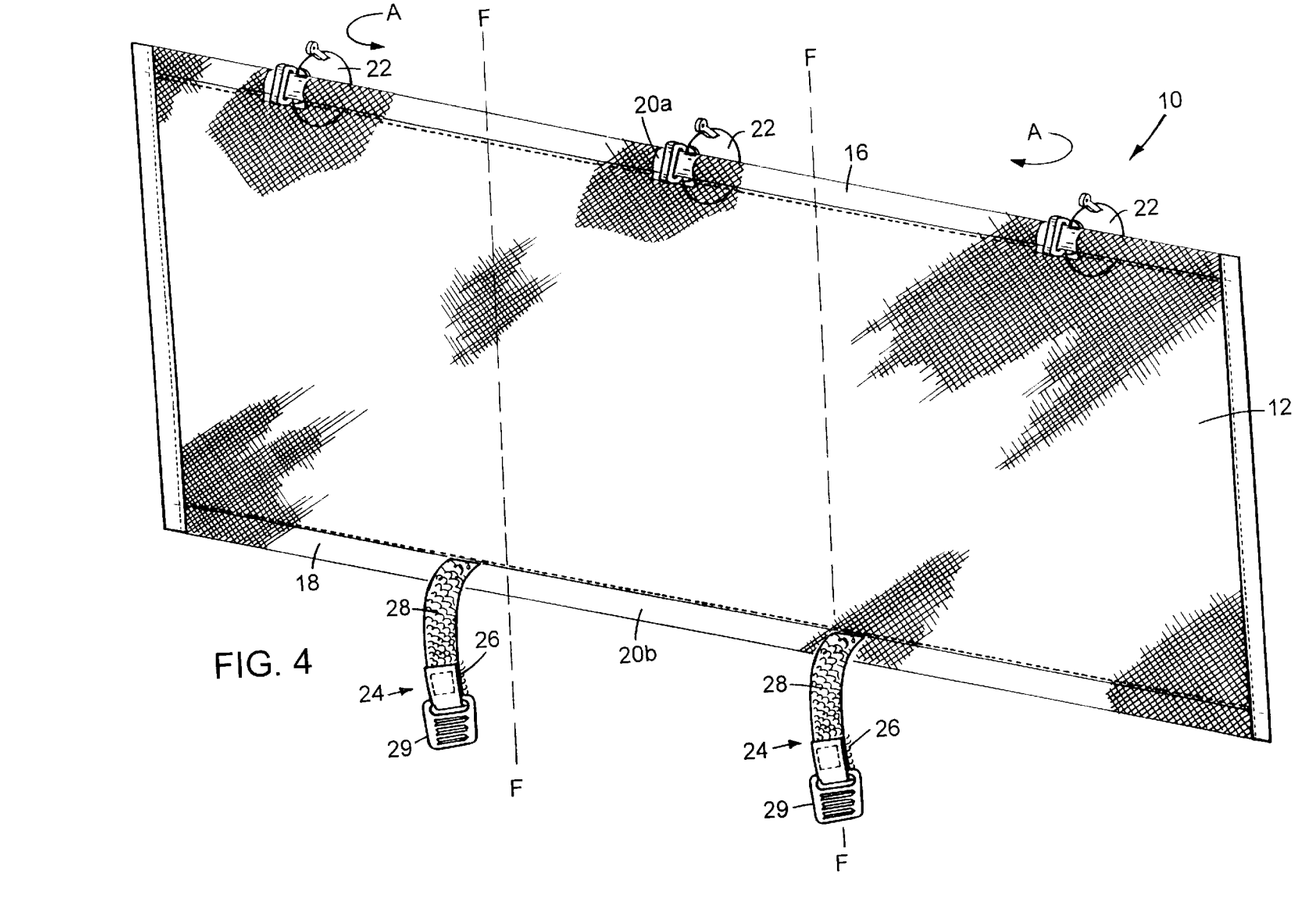
FIGS. 4–4C are sequential perspective views showing the steps involved in folding and rolling the sunshade of FIG. 1 for storage, with FIG. 4C showing the sunshade in its folded, rolled configuration.
Figure 4A:
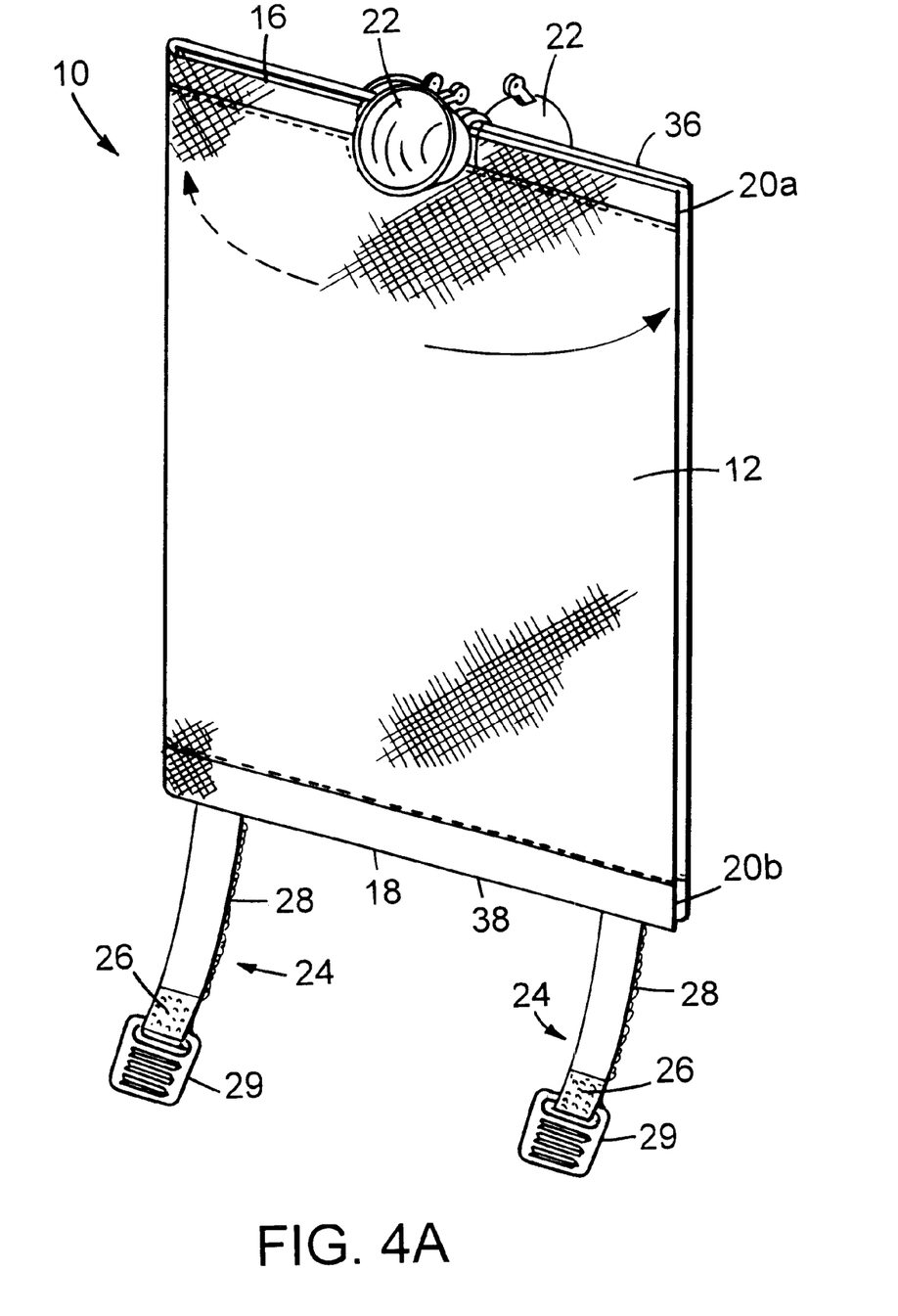
Figure 4B:
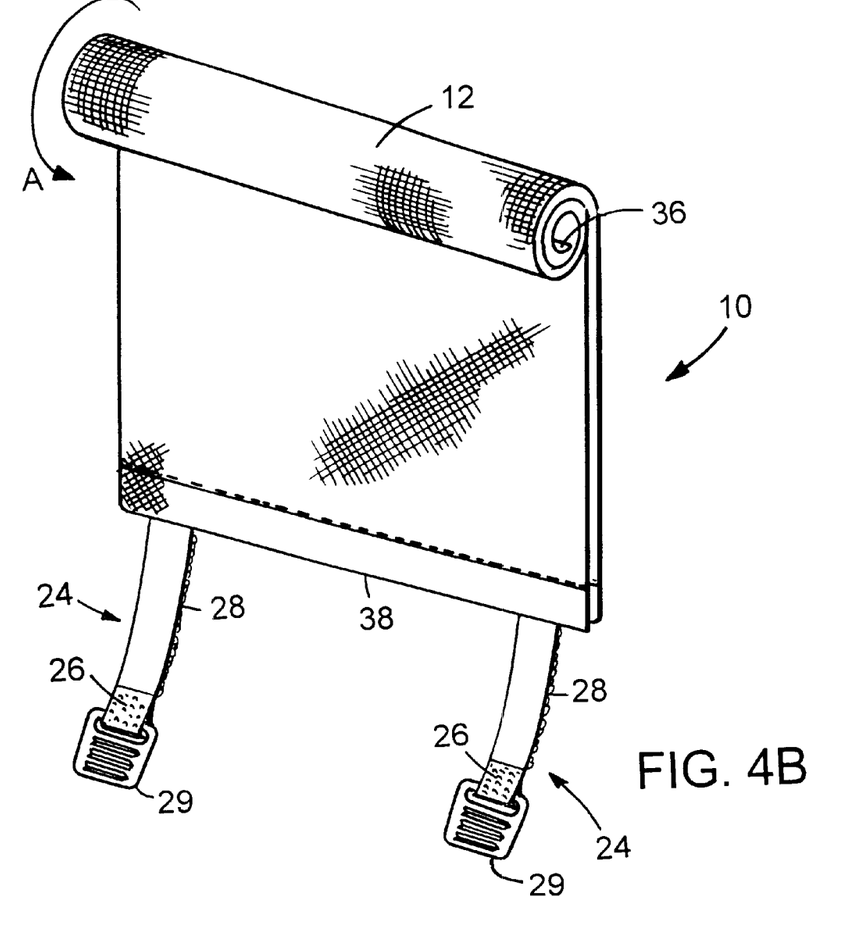
Figure 4C:
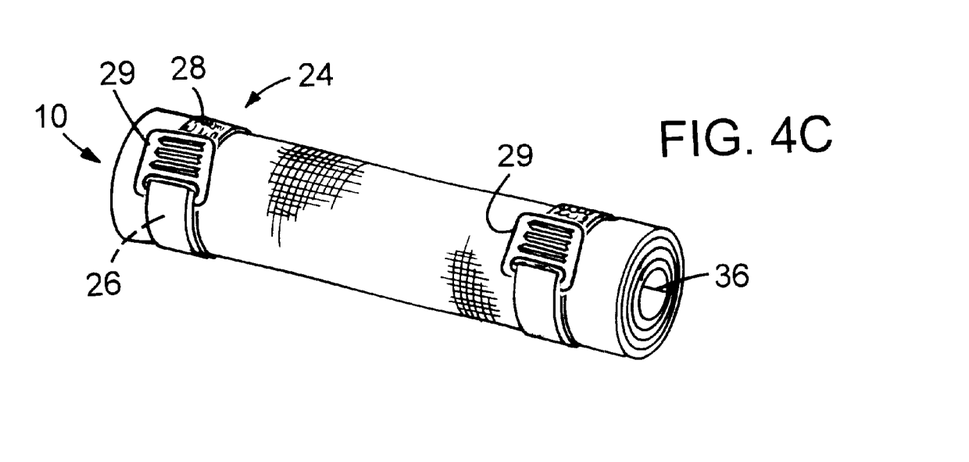

The preferred steps for folding and rolling the sunshade 10 are shown in FIGS. 4–4C. First, as shown in FIG. 4, the sunshade is folded approximately along lines F, with each side being folded toward the middle as indicated by arrows A. The sunscreen is then held in its folded position (FIG. 4A), and the top edge 36 is rolled towards the bottom edge 38, as indicated by arrow A in FIG. 4B. When the sunshade has been completely rolled up, the straps 24 are wrapped tightly around the roll, and hook elements 26 are pressed into engagement with corresponding loop elements 28 to secure the straps around the roll, as shown in FIG. 4C.

Figure 5:
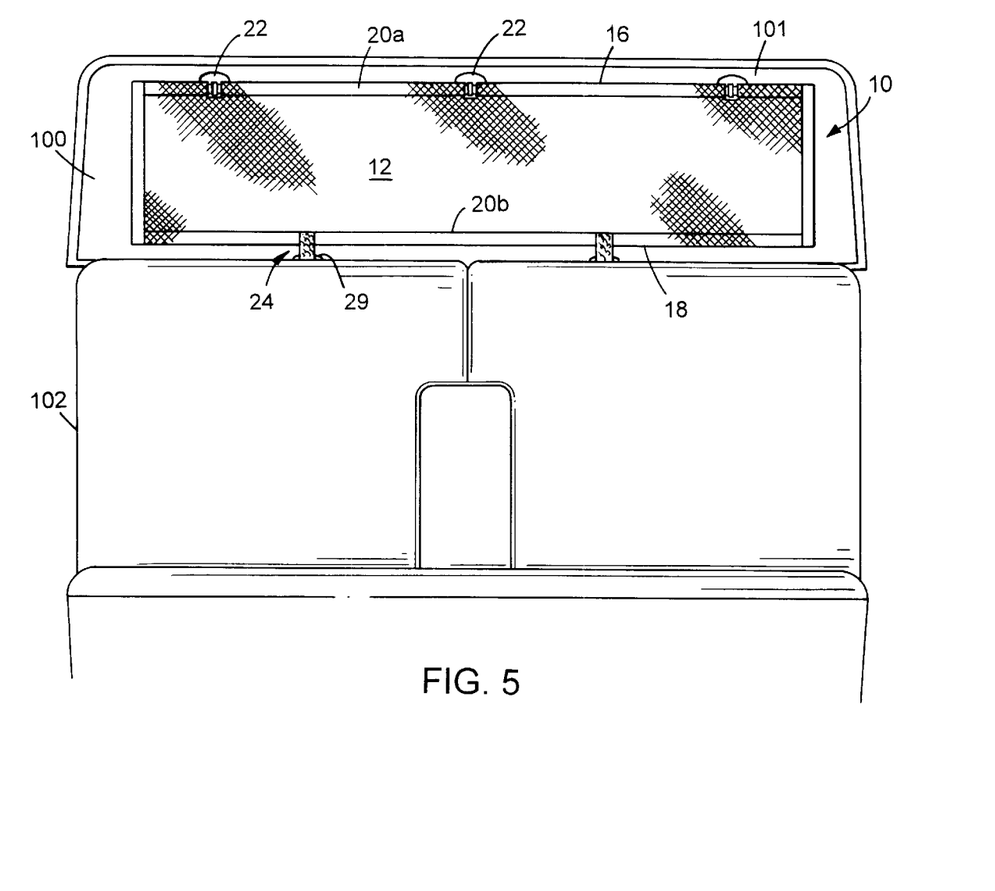
FIG. 5 shows the sunshade installed across a rear window of a vehicle.
Figures 5A, 5B:
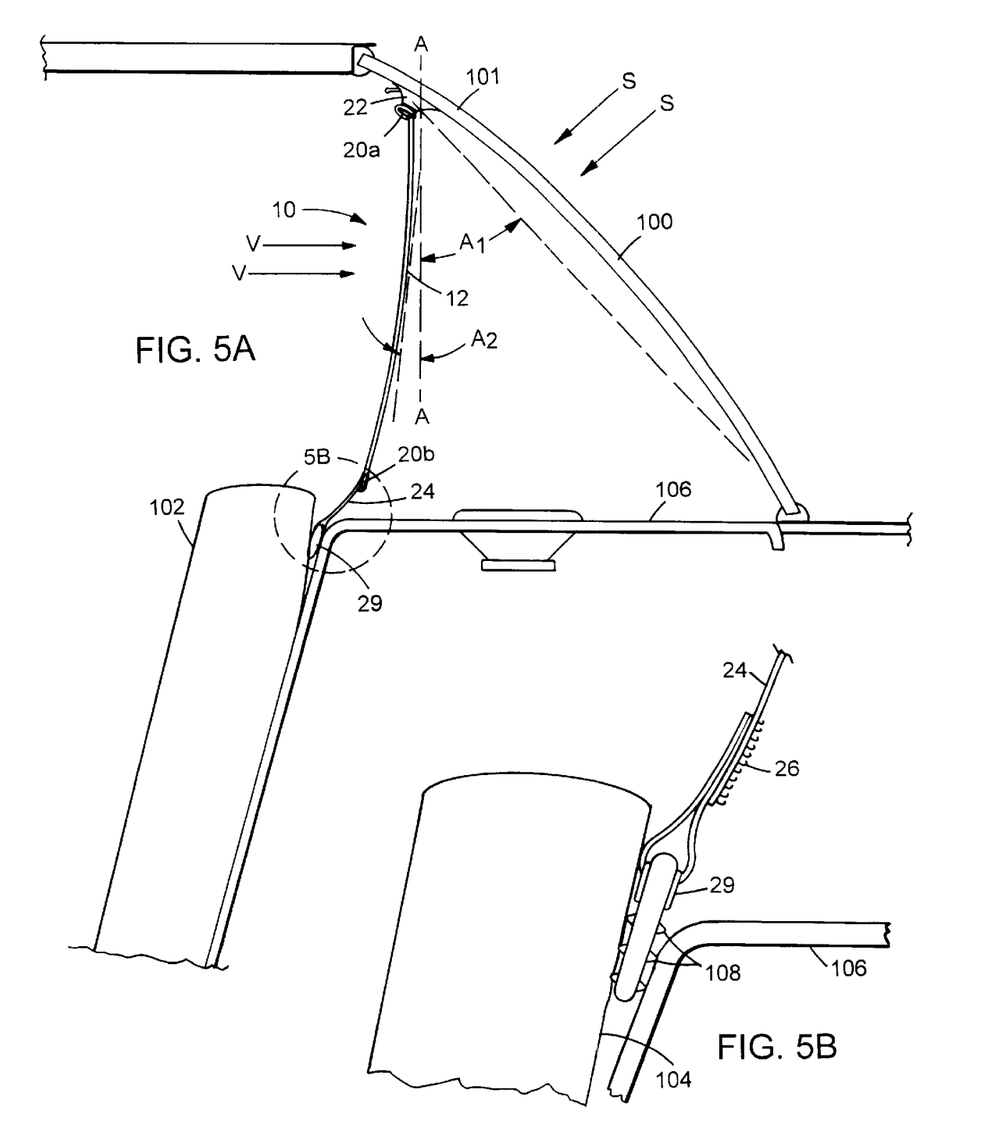
FIG. 5A is a cross-sectional view, taken along line A—A in FIG. 5.
FIG. 5B is an enlarged view of area 5B in FIG. 5A.

Referring now to FIGS. 5–5B, the sunshade 10 can be mounted in a rear window 100 of a vehicle by attaching suction cups 20 to the window surface at the upper edge 101 of the window, and then securing the lower edge of the shade by wedging clips 29 between the seat back 104 of rear seat 102 and the speaker deck 106 (FIG. 5B). Preferably, the clips 29 include ridges 108, as shown in FIG. 5B, to enhance the wedging engagement.

Preferably, the shade material has an opacity that increases with an angle of incidence with respect to a direction normal to the sheet material. Thus, when the shade material is viewed in a direction normal to the sheet material (arrows V, FIG. 5A) it is relatively transparent (transparent enough to see through when driving). When the shade material is viewed in a direction that is at a significant angle with respect to a direction normal to the sheet material (arrows S, FIG. 5A) it is relatively opaque, and thus blocks sunlight incident from such a direction. As a result, when this shade material is used the sunshade is most effective if its upper edge is secured to the vehicle along an upper portion 101 of an inclined rear window 100 of the vehicle, and its lower edge is secured at a point selected so that the fore-aft inclination of the shade in its secured position is significantly less than that of the window (preferably behind the back seat 102, as shown). In other words, the angle of the window to vertical axis A (angle A1; measured with respect to the overall inclination of the window) is significantly greater than the angle of the shade with respect to the vertical axis A (angle A2; measured with respect to the inclination of the midpoint elevation of the shade). When the shade is secured in this manner, the opacity of the shade relative to sunlight entering the vehicle generally normal to the inclined rear window (arrows S) is substantially greater than the opacity of the shade relative to a line of sight extending generally horizontally through the rear window (arrows V).

A suitable shade material for screen 12, for example, is a 100% polyester in a tricot weave to produce a mesh with about 72% light blockage (preferably, between about 65% and 80% light blockage) in a direction normal to the mesh, and even greater light blockage in directions angled with respect to the mesh normal. Each filament is of about 50 denier. The mesh has a basis weight of about 80 grams per yard (60 inches wide). A suitable example of such a material is available from Chia Yih Development as Item No. 3384.

Other embodiments are within the claims.

What is claimed is:

1. A sunshade for a vehicle window, comprising:
a shade having upper and lower edges;
a pair of support members having free ends, one of the members being associated with each of the upper and lower edges, the support members being constructed to be spaced apart to support the shade in an extended, open position during use;
a plurality of suction cups to secure the sunshade to the window mounted on said upper support member, wherein each of said suction cups includes a mounting structure having a bore through which said support members extends; and
wherein each of said support members comprising a self-straightening tape that is arcuate in cross-section and can be repeatedly folded without significant plastic deformation.

2. The sunshade of claim 1 wherein said upper and lower edges each include a hem and said support members are retained in said hems.

3. The sunshade of claim 2 wherein the hem of the upper edge is segmented, the sunshade further comprising fastening means secured to the support member of the upper edge and positioned between segments of the upper edge hem.

4. The sunshade of claim 1 wherein bases of the suction cups are arranged to not overlap along the length of the folded tape when the tape is folded into equal thirds.

5. The sunshade of claim 1 wherein each of said support members comprises a length of convex rule material.

6. The sunshade of claim 1 wherein said support members are formed of a material selected from the group consisting of steel, fiberglass and plastic.

7. The sunshade of claim 1 wherein said support members are coated with plastic or epoxy.

8. The sunshade of claim 1 wherein said arcuate cross-section has a radius of curvature of from about 15 to 25 millimeters.

9. The sunshade of claim 1 wherein said supporting members are constructed to allow said shade to be folded in thirds for storage, and to resiliently return the shade to its open position for use.

10. The sunshade of claim 1 wherein said shade comprises a length of fabric.

11. A method of blocking sunlight within a vehicle, the method comprising
providing the sunshade of claim 1;
attaching the upper edge of the sunshade to the vehicle near an upper edge of a window of the vehicle; and
attaching the lower edge of the sunshade to the vehicle at a point space apart from and lower than the upper edge of the sunshade, to extend the shade across a significant portion of the window to block at least some sunlight entering the window.

12. A method of collapsing a reusable vehicular sunshade for storage between uses, the sunshade having upper and lower edge support members, the method comprising the steps of
folding both upper and lower edge support members of the sunshade at multiple points to place the sunshade in a flat, folded condition having a width significantly less than that of the sunshade in its unfolded state;
rolling the folded sunshade about its upper edge support member to form a roll with the lower edge member of the sunshade disposed along an outer surface of the roll; and then
wrapping a releasable strap about the rolled sunshade to retain it in its folded and rolled condition.

13. The method of claim 12 wherein said upper and lower edges of said sunshade each include a hem and said support members are retained in said hems.

14. The method of claim 13 wherein the hem of the upper edge is segmented, the sunshade further comprising fastening means secured to the support member of the upper edge and positioned between segments of the upper edge hem.

15. The method of claim 13 wherein the sunshade further comprises, mounted on said upper support member, a plurality of suction cups to secure the sunshade to the window.

16. The method of claim 15 wherein said bases of the suction cups are arranged to not overlap along the length of the folded tape when the tape is folded into equal thirds.

17. The method of claim 15 wherein each of said suction cups includes a mounting structure having a bore through which said support members extends.

18. The method sunshade of claim 12 wherein each of said support members comprises a length of convex rule material.

19. The method of claim 12 wherein said support members are formed of a material selected from the group consisting of steel, fiberglass and plastic.

20. The method of claim 12 wherein said support members are coated with plastic or epoxy.

21. The method of claim 12 wherein each of said support members further comprise a self-straightening tape that is arcuate in cross-section and can be repeatedly folded without significant plastic deformation.

22. The method of claim 21 wherein said arcuate cross-section has a radius of curvature of from about 15 to 25 millimeters.

23. The method of claim 12 wherein the sunshade further comprises a plurality of straps, extending from said lower edge constructed and arranged to secure the sunshade in a rolled configuration.

24. The method of claim 23 wherein each strap includes an array of hook-engageable fibers and an array of hooks positioned to selectively engage the fibers when the sunshade is in a rolled configuration and the strap is wrapped around the rolled shade.

25. The method of claim 23 wherein each strap carries a tab at a free end thereof, the tab of a size and shape selected to enable the tab to be wedged behind a back seat of a vehicle to secure the lower edge of the shade.

26. The method of claim 12 wherein said supporting members are constructed to allow said shade to be folded in thirds for storage, and to resiliently return the sunshade to its open position for use.

27. The method of claim 12 wherein said sunshade comprises a length of fabric.

28. The method of claim 27 wherein said fabric is a mesh material.

29. A method of blocking sunlight within a vehicle, the method comprising providing a shade of flexible sheet material having an opacity that increases with an angle of incidence with respect to a direction normal to the sheet material, the shade having upper and lower edges;

securing the upper edge of the shade to the vehicle along an upper portion of an inclined rear window of the vehicle, at a point above a forward edge of a rear deck of the vehicle spanning a horizontal space between a base edge of the rear window and an upper rear seat back of the vehicle; and securing the lower edge of the shade to the vehicle at a point forward of the rear deck, such that fore-aft inclination of the shade in its secured position is significantly less than that of the window, such that the opacity of the shade relative to light entering the vehicle generally normal to the inclined rear window is substantially greater than the opacity of the shade relative to a line of sight extending generally horizontally through the rear window.

30. The method of claim 29 wherein the lower edge of the shade is secured to the vehicle by wedging a free end of a strap, extending from the lower edge of the shade, between the rear deck and the upper rear seat back.

31. The method of claim 14 wherein the shade further comprises a self-straightening support member extending along its upper edge.

32. A sunshade for a vehicle window, comprising:

a shade having upper and lower edges;

a plurality of straps, extending from said lower edge constructed and arranged to secure the sunshade in a rolled configuration;

a pair of support members having free ends, one of the members being associated with each of the upper and lower edges, the support members being constructed to be spaced apart to support the shade in an extended, open position during use;

each of said support members comprising a self-straightening tape that is arcuate in cross-section and can be repeatedly folded without significant plastic deformation; and wherein said straps each carry a tab at a free end thereof, the tab of a size and shape selected to enable the tab to be wedged behind a back seat of a vehicle to secure the lower edge of the shade.

33. The sunshade of claim 32 wherein each strap includes an array of hook-engageable fibers and an array of hooks positioned to selectively engage the fibers when the sunshade is in a rolled configuration and the strap is wrapped around the rolled shade.

34. The sunshade of claim 33 wherein said fabric is a mesh material.

* * * * *